(No Model.)
C. W. HUNT.
CAR TRUCK.
No. 452,134. Patented May 12, 1891.
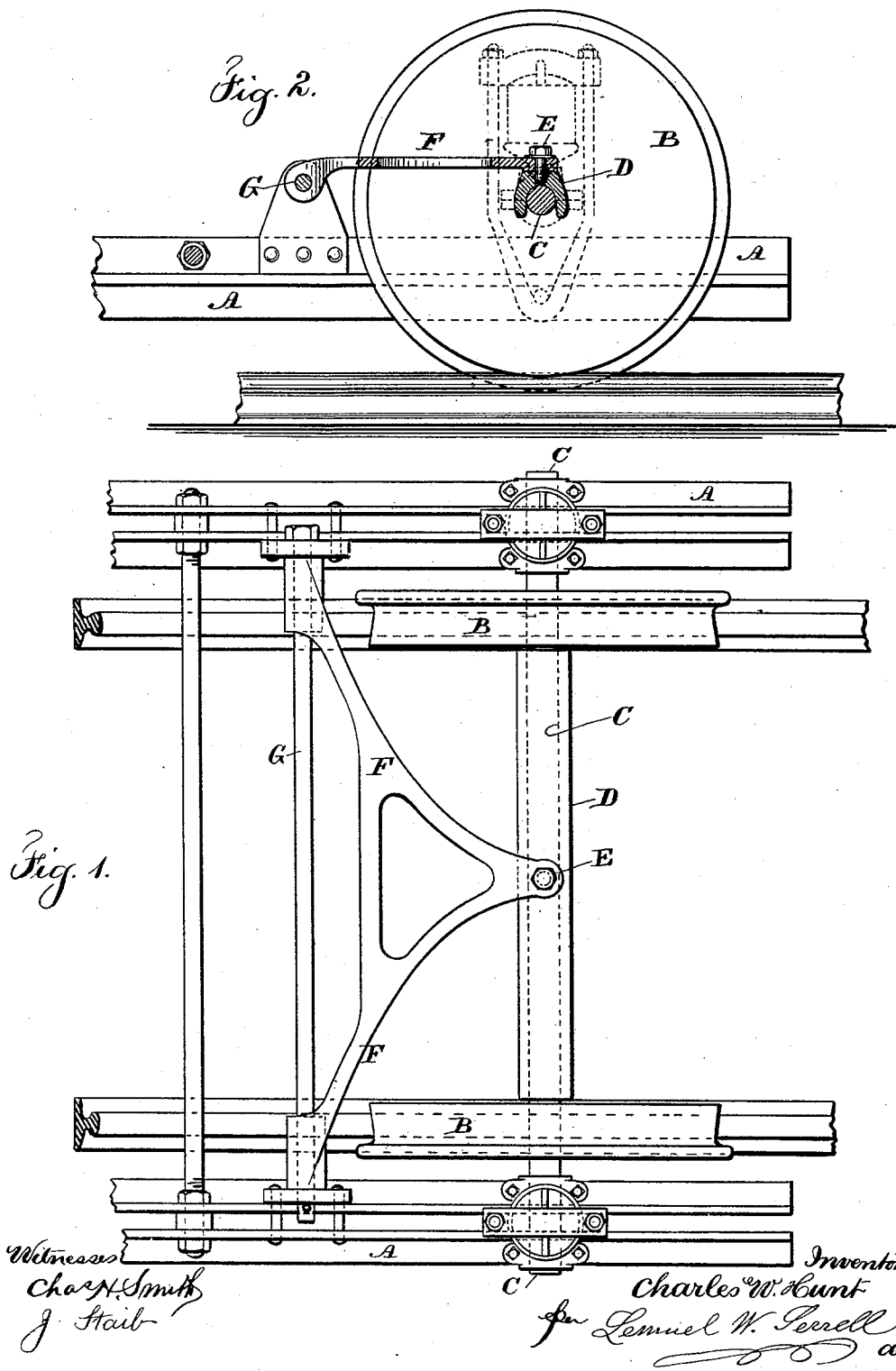

UNITED STATES PATENT OFFICE.

CHARLES W. HUNT, OF WEST NEW BRIGHTON, NEW YORK.

CAR-TRUCK.

SPECIFICATION forming part of Letters Patent No. 452,134, dated May 12, 1891.

Application filed February 16, 1891. Serial No. 381,596. (No model.)

*To all whom it may concern:*

Be it known that I, CHARLES W. HUNT, a citizen of the United States, residing at West New Brighton, in the county of Richmond and State of New York, have invented an Improvement in Car-Trucks, of which the following is a specification.

This invention is an improvement upon that for which Letters Patent No. 347,936 were granted to me August 24, 1886. In the said patent and in my patent, No. 256,571, the frame of the car and the bearings for the same come within the wheels. Hence with narrow tracks, such as are used in mines and for engineering work—such as grading, &c.—the bearing for the car-body upon the axle is often narrow.

My present improvements are made with special reference to providing external bearings for the car-axle, and in carrying out this invention I make use of a central pivot or king-bolt, a bearing therefor upon the axle, and a connector between the king-bolt and the car-frame, so that said connector may rise and fall at the king-bolt and the axle can turn thereupon into a more or less inclined position for passing around a curved track.

In the drawings, Figure 1 is a plan view representing the frame-work at one end of a car and the axle and wheels. Fig. 2 is a vertical central section longitudinally of the car.

The car-frame A is to be of any suitable size and character. Preferably it is made of metal, and the wheels B are upon an axle C, and around this axle C is a sleeve or bearing D, having a central king-bolt E, and this king-bolt passes into the apex of a connector F, that occupies a horizontal or nearly horizontal position beneath the body of the car, and the other end of this connector F is attached to the car-frame, preferably by a cross-bolt G passing through ears or lugs upon the car-frame A. This connector F and king-bolt E allow the axle C to swing into a more or less angular position to the frame A, so that the axle C occupies a radial position, or nearly so, upon a curved track.

The bearer or sleeve D is applied to the axle so as to prevent end motion of the axle in relation to the sleeve or bearer, and the king-bolt E is always equidistant from the wheels, and the frame of the car, passing outside of the wheels, receives the ends of the axle in any suitable bearings, and the weight of the car may rest upon the ends of the axles in any suitable bearings, and upon the frame stops may be provided that limit the extent of turning motion that the axle and bearer can receive upon the king-bolt, thereby preventing the axle occupying a more inclined position to the car than is needed for passing the shortest curved track used by the car.

Upon reference to the plan view, Fig. 1, it will be observed that the flanges of the wheels B are upon the outer edges and come outside the track-rails and that the wheels are conical inwardly. I find that these wheels are needed in connection with the connector F and bearer D and king-bolt before described, because the conical treads of the wheels compel the pair of wheels to travel upon the track with the axle at right angles, or nearly so, to such track, either upon the straight track or upon a curve, and when the wheels enter a curve the tendency of movement resulting from the inertia is to cause the wheels to run toward the outside of the curve, bringing the larger diameter of the conical tread upon the outer rail and the smaller diameter of the other wheel upon the inner rail, and the friction of the flange against the rail at the inner side of the curve tends to turn the axle sufficiently to assume a radial line to the curve, and it is usual upon curves of short radius to have the flange of the wheel at the outer side of the curve to run upon a rail, and such flange mounts upon the rail with facility, because the resistance in so doing is assisted by the friction of the flange of the other wheel against the edge of the inner rail of the curve. For these reasons I am enabled to use single axles and their wheels pivoted at the center by king-bolts, regardless of any controlling force exerted by suspended bearers, as in my aforesaid patent, No. 347,936.

I claim as my invention—

The combination, with the car-wheels having outside flanges and an axle and the frame passing outside the car-wheels, of a sleeve or bearer upon the axle between one wheel and the other, a central king-bolt, and a connector receiving the king-bolt at one end and attached at the other end to the car-frame, substantially as set forth.

Signed by me this 12th day of February, 1891.

CHAS. W. HUNT.

Witnesses:
GEO. T. PINCKNEY,
WILLIAM G. MOTT.